(12) United States Patent
Schmidt et al.

(10) Patent No.: US 7,543,777 B2
(45) Date of Patent: Jun. 9, 2009

(54) AIR GUIDING FLAP OF AN AIRCRAFT COMPRISING CONTROL OF THE PRESSURE FORCES IMPINGING THEREON, PROCESS FOR ADJUSTING THE POSITION OF AN AIR GUIDING FLAP AND RAM AIR SYSTEM INCLUDING SUCH AN AIR GUIDING FLAP

(75) Inventors: Rüdiger Schmidt, Fredenbeck (DE); Alexander Solntsev, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 410 days.

(21) Appl. No.: 10/582,567

(22) PCT Filed: Dec. 30, 2004

(86) PCT No.: PCT/EP2004/014856

§ 371 (c)(1),
(2), (4) Date: Jun. 12, 2006

(87) PCT Pub. No.: WO2005/063564

PCT Pub. Date: Jul. 14, 2005

(65) Prior Publication Data

US 2007/0145186 A1    Jun. 28, 2007

(30) Foreign Application Priority Data

Dec. 30, 2003   (DE) .............................. 103 61 644

(51) Int. Cl.
*B64D 33/00* (2006.01)
*F02C 7/04* (2006.01)
(52) U.S. Cl. ...................... 244/53 B; 60/262; 244/53 R

(58) Field of Classification Search ............... 244/53 B, 244/53 R, 58; 60/226.1, 230, 262; 137/15.1
See application file for complete search history.

(56) References Cited

U.S. PATENT DOCUMENTS 3,196,609 A * 7/1965 Ingram et al. ................. 60/262

(Continued)

FOREIGN PATENT DOCUMENTS

DE            10119433 C1      8/2002

(Continued)

OTHER PUBLICATIONS

Forms PCT/ISA/210, 220, 237 International Search Report for PCT/EP2004/014856, mailed on Jun. 1, 2005.

*Primary Examiner*—Rob Swiatek
(74) *Attorney, Agent, or Firm*—Wood, Herron & Evans, L.L.P.

(57) ABSTRACT

An air guiding flap of an aircraft wherein one surface thereof faces an air duct and is exposed to a prevailing pressure in the air duct and whose opposite surface is exposed to the pressure of the relative wind flowing past the aircraft. The air guiding flap comprises an actuator for automatically opening and closing the air guiding flap which actuator cooperates with a device for controlling the position of the air guiding flap. In order to keep the stress on the air guiding flap low a force detecting device is provided which detects the force impinging on the actuator base don a difference between the prevailing pressure in the air duct and the pressure of the relative wind flowing past the aircraft. The controlling device adjusts the position of the air guiding flap such that the force impinging on the actuator at any one time is at least essentially zero.

8 Claims, 2 Drawing Sheets

U.S. PATENT DOCUMENTS

Figure 1:
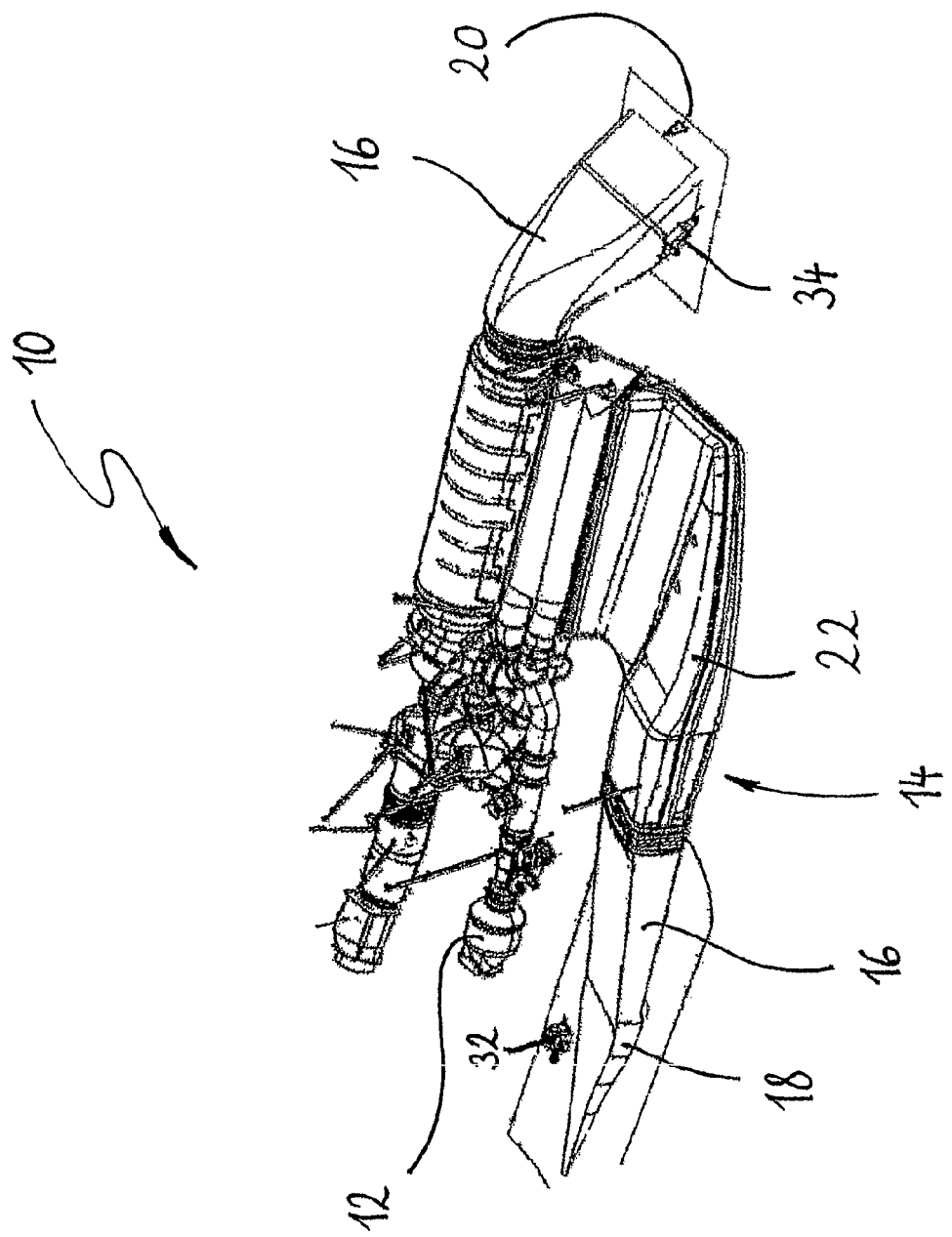

| | | | | |
|---|---|---|---|---|
| 3,238,716 A | * | 3/1966 | Sandre | 60/262 |
| 4,064,692 A | * | 12/1977 | Johnson et al. | 60/762 |
| 4,991,795 A | * | 2/1991 | Koncsek | 244/53 B |
| 5,046,686 A | | 9/1991 | Carla et al. | |
| 6,272,838 B1 | | 8/2001 | Harvell et al. | |

FOREIGN PATENT DOCUMENTS

| | | |
|---|---|---|
| DE | 10201426 A1 | 7/2003 |
| EP | 0342069 B1 | 8/1994 |
| FR | 886438 | 10/1943 |
| FR | 942092 | 1/1949 |

* cited by examiner

AIR GUIDING FLAP OF AN AIRCRAFT COMPRISING CONTROL OF THE PRESSURE FORCES IMPINGING THEREON, PROCESS FOR ADJUSTING THE POSITION OF AN AIR GUIDING FLAP AND RAM AIR SYSTEM INCLUDING SUCH AN AIR GUIDING FLAP

The present invention relates to air guiding flaps of aircraft, particularly aeroplanes, and a ram air system including such an air guiding flap. In particular the present invention relates to a ram air escape flap, however the basic principle of the present invention is applicable to any air guiding flap.

Air guiding flaps on aircraft can be exposed to strong aerodynamic forces particularly in the event that they are disposed on the outside of an aircraft and exposed to the pressure of the relative wind flowing past the aeroplane. This relates for example to the ram air escape flap of a ram air system which is part of a fresh air generating system of an aircraft.

The fresh air feeding to an aircraft cabin is normally generated by guiding hot engine air known as bleed air through an air conditioning unit for the purpose of cooling and afterwards feeding it to the aircraft cabin at the desired temperature and at the desired pressure. As a cooling medium for the air conditioning unit outside air is employed which outside air flows during the flight through a ram air intake flap disposed on the aircraft into a ram air duct out of which the ram air then flows through the air conditioning unit and finally to a ram air escape flap through which the now warmer ram air leaves the aircraft again. By changing the position of the ram air escape flap the quantity of cooling air that flows through the air conditioning unit is controlled. In the event that more cooling air is required the ram air escape flap is forcibly opened accordingly. Afterwards the enlargement of the intake opening of the ram air duct is brought about by means of a forcible opening of the ram air intake flap. By means of the enlargement of the flow cross section of the intake opening of the ram air duct more cooling air enters the ram air duct and reaches the air conditioning unit. In the event that less cooling air is required firstly the ram air escape flap is accordingly forcibly closed followed by forcibly closing the ram air duct intake flap. Thus, this is a so-called Master-Slave control wherein the ram air escape flap is the "Master" and the ram air intake flap is the "Slave".

The operation of such a ram air escape flap is characterised by strong changes of stress. In the event that the ram air escape flap is widely forcibly opened it is stressed by the external forces (tensile force) that are brought about by the dynamic pressure of the relative wind. Should the ram air escape flap contrarily be forcibly opened only slightly it is stressed by the internal forces (force of pressure), brought about by the flow of the cooling air. These frequently changing strong stresses during the operation of the aircraft lead to recurring problems with the function of the ram air escape flap which the result that it must be regularly inspected and frequently repaired.

To solve this problem the ram air escape flap has recently been simply omitted thereby lowering the production costs of the aircraft and circumventing the maintenance problem, nevertheless in this manner power reserves are surrendered with the result that the air conditioning unit must be more powerfully and thus more heavily embodied and also more expensively than is really necessary. Further the omitting of the ram air escape flap leads to an increasing of the air resistance of the aircraft in operation and thus to an equally undesired increase of the fuel consumption.

Another possible solution exists wherein the ram air escape flap is sufficiently robustly embodied as to resist all occurring stresses. The ram air escape flap would then however be significantly heavier and also more expensive than previously which would lead to increased operating- and production costs.

The object of the invention is to provide a solution to the problem cited above wherein by means of the use of an air guiding flap embodied as a ram air escape flap the advantages of the presence of a ram air escape flap, namely reduced air resistance of an aircraft and increased potential performance of an air conditioning unit, are obtained without negatively influencing the production and operating costs.

Departing from an air guiding flap of an aircraft wherein one of its surfaces facing an air duct is exposed to the prevailing pressure in the air duct and whose opposite surface is exposed to the pressure of the relative wind flowing past the aircraft and comprising an actuator for automatically opening and closing of the air guiding flap which actuator cooperates with an arrangement for controlling the position of the air guiding flap the object in accordance with the invention is achieved by the presence of a force detecting arrangement which detects the force impinging on the actuator based on a difference between the prevailing pressure in the air duct and the pressure of the relative wind flowing past the aircraft and wherein the controlling arrangement adjusts the position of the air guiding flap such that the force impinging on the actuator at any one time is at least approaching zero. In other words the air guiding flap according to the invention is always adjusted such as to avoid excessive forces impinging thereon and further that the forces of pressure impinging on its two sides, i.e. the dynamic pressure brought about by the relative wind on the one hand and the dynamic pressure in the duct on the other substantially cancel one another out. In this manner at every operating moment the force impinging on the actuator is slight or not present at all. It is understood that the actuator and the force impinging thereon are not significant and rather that only the measurement of the force impinging on the actuator serves as a directly correlated measurement of the stress of the air guiding flap. In accordance with the invention therefore the position of the air guiding flap is controlled according to the principle of aerodynamically balanced forces.

In the event that an air guiding flap thus embodied is used as a ram air escape flap of a fresh air generating system for an aircraft the problems outlined at the outset with reference to such a system are solved. Therefore, with a preferred embodiment of the invention the air guiding flap is a ram air escape flap and the pressure in the air duct is a dynamic pressure. The ram air escape flap is forcibly closed in the event that the force of pressure of the relative wind flowing past the aircraft impinging thereon is greater than the force of pressure of the dynamic pressure in the air duct impinging thereon until at least an approaching equilibrium of the said force of pressures has ensued.

In accordance with a further preferred embodiment of the invention which preferred embodiment is preferably combined with the just cited embodiment the air guiding flap is again a ram air escape flap and the pressure in the air duct is a dynamic pressure. The ram air escape flap is forcibly opened in the event that the force of pressure of the relative wind flowing past the aircraft impinging thereon is less than the force of pressure of the dynamic pressure in the air duct impinging thereon until at least an approaching equilibrium of the said force of pressures has ensued.

The problem cited at the outset is particularly solved with a ram air system for the purpose of supplying an auxiliary assembly of an aircraft with ram air which ram air system comprises a ram air duct having an intake opening and an escape opening and from which ram air duct is taken the required ram air for the auxiliary assembly and further comprises a ram air intake flap controlling the flow cross section of the intake opening and a ram air escape flap controlling the flow cross section of the escape opening, wherein in accordance with the invention the quantity of the required ram air for the auxiliary assembly is controlled by opening or closing the ram air intake flap and further that the ram air escape flap is an air guiding flap in accordance with one of the exemplified embodiments described above.

With the above mentioned ram air system the auxiliary assembly is in accordance with a preferred embodiment a fresh air generating device of an aircraft. Such a fresh air generating device serves to bring the air feeding into the cockpit and the cabin of the aircraft to cabin pressure and to a desired temperature and preferably in this case the control parameter for the position of the ram air intake flap is the temperature at the output of the compressor (also described as an air washbox or turbo cooler) of the fresh air generating device. The control is brought about in the case of a preferred embodiment such that the ram air intake flap is forcibly opened when the compressor output temperature exceeds a predetermined temperature value. Should the compressor output temperature fall short of a predetermined temperature value the ram air intake flap is forcibly closed. The aforementioned predetermined temperature value can be one and the same temperature value although a temperature value can also be determined the exceeding of which can cause the ram air intake flap to be forcibly opened and a further temperature value can be determined the falling short of which can cause the ram air intake flap to be forcibly closed. Unlike the previously normal procedure the quantity of required ram air is therefore adjusted and/or controlled by changing the flow cross section of the ram air duct intake opening. In the event that for the purpose of increasing the ram air quantity the flow cross section of the ram air duct intake opening is enlarged (by forcible opening of the ram air intake flap) this leads to an increase of the force of pressure exerted on the ram air duct-facing surface of the ram air escape flap. In order to equilibrate the ram air escape flap with respect to forces therefore the ram air escape flap is forcibly opened in order to reduce the flow resistance for the air flowing through the ram air duct. The forcible opening of the ram air escape flap is realised until the ram air escape flap is equilibrated with respect to forces, i.e. until the dynamic pressure in the ram air duct complies at least substantially with the dynamic pressure exerted on the ram air escape flap by the relative wind from outside.

Should on the other hand the ram air quantity flowing through the ram air duct be reduced the ram air intake flap is accordingly forcibly closed. In the ram air duct the dynamic pressure thereby reduces and consequently the force exerted on the inside of the ram air escape flap. The ram air escape flap is forcibly closed until an equilibrium of the aerodynamic flow forces impinging on the ram air escape flap is achieved. The forcible closing of the ram air escape flap reduces the flow resistance of the aircraft and thereby contributes to the saving of fuel.

In its most general form the present invention thus relates to a process for controlling the position of an air guiding flap of an aircraft characterised in that the position of the air guiding flap is always controlled such that the aerodynamic forces impinging on an inner side and an outer side of the air guiding flap are at least approaching equilibrium.

Figure 2:
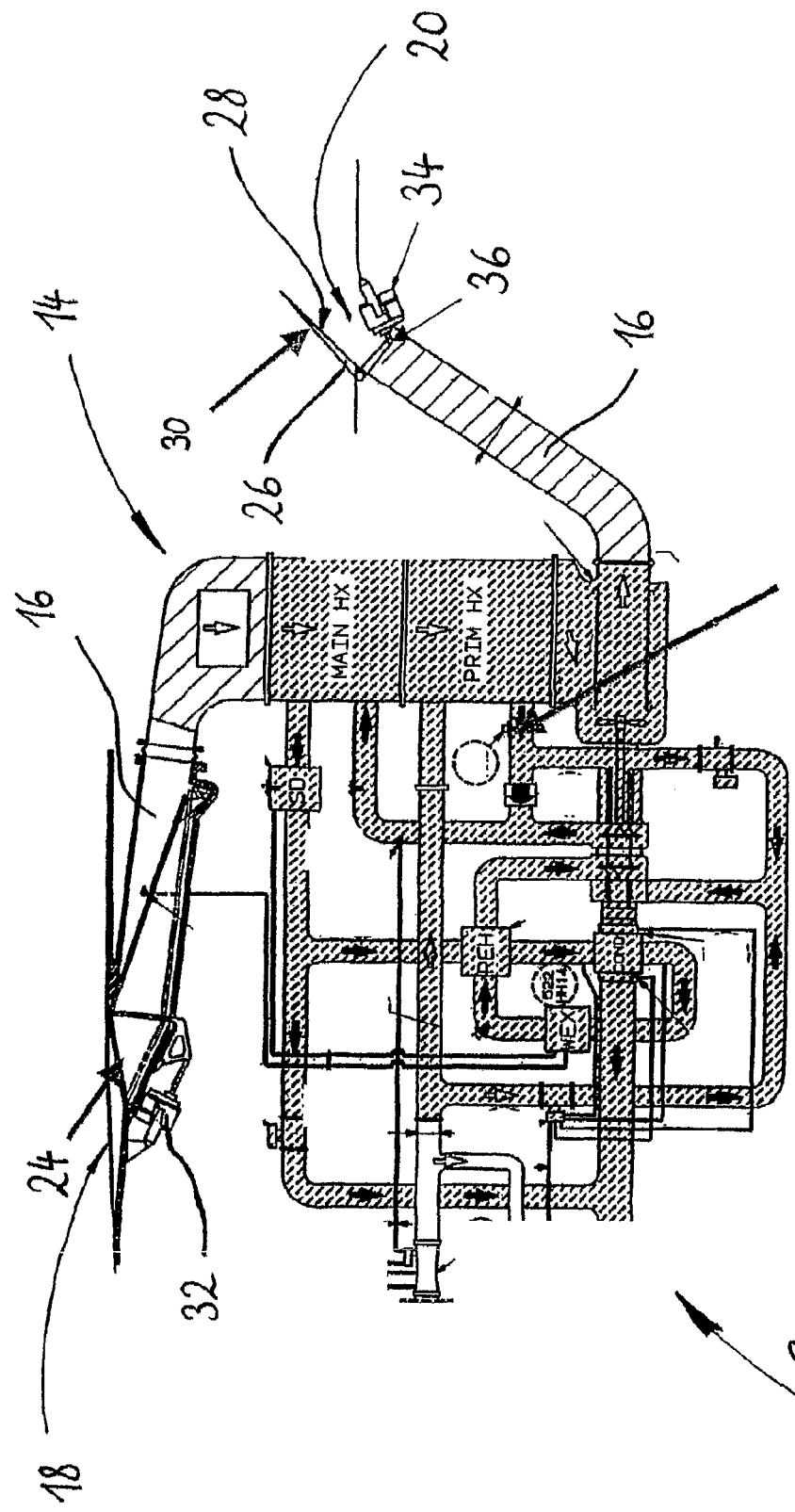

An exemplary embodiment of the invention is described more closely in the following schematic figures wherein:

FIG. 1 shows a perspective view of a fresh air generating system of an aircraft wherein an air guiding flap according to the invention is employed as an air escape flap which air guiding flap is position-controlled according to the process in accordance with the invention, and FIG. 2 shows a schematic sectional view of the fresh air generating system from FIG. 1.

In FIG. 1 is illustrated, designated in general with 10, a fresh air generating system for an aircraft. The fresh air generating system 10 serves for the preparation of air to be fed to an aircraft cabin. For this purpose hot air from the engine or engines of the aircraft (or also from an auxiliary turbine of the aircraft) is bled off and guided through a bleed air intake 12 into the fresh air generating system 10. The bleed air has a temperature of around 200° C. and is depressurized and cooled in the fresh air generating system 10. For cooling purposes outside air is employed which outside air is available during the flight as ram air and which can be fed by means of a ram air system 14 to the fresh air generating system 10.

The ram air system 14 comprises a ram air duct 16 with a ram air duct intake opening 18 and a ram air duct escape opening 20. A diffuser 22 which in the present case is laterally disposed on the ram air duct 16 distributes the ram air serving as cooling air over the surface of heat exchangers of the fresh air generating system 10 for the purpose of cooling the hot bleed air.

In order to minimise the additional flow resistance of the aircraft that is generated via the ram air duct 16 the cooling air quantity flowing through the ram air duct 16 during the flight is always kept as low as possible. The controlling of the cooling air quantity is part of a temperature controller of the fresh air generating system 10. Control parameter is the temperature at the output of a compressor of the fresh air generating system 10 which compressor is controlled to a predetermined value during the flight, for example to 180° C. Should the compressor output temperature rise above this value the cooling air quantity flowing through the ram air duct 16 must be increased. Should the compressor output temperature fall below this value the cooling air quantity must be reduced.

For the purpose of controlling the cooling air quantity flowing through the ram air duct 16 a ram air intake flap 24 and a ram air escape flap 26 are provided. With the ram air intake flap 24 the flow cross section of the ram air duct intake opening 18 can be changed from a value of zero (closed position of the ram air intake flap) up to a maximum value (open position of the ram air intake flap). In the same manner by way of the ram air escape flap 26 the flow cross section of the ram air duct escape opening 20 can be adjusted.

The ram air escape flap 26 is disposed in or near the outer skin of the aircraft body and has one surface 28 facing the ram air duct 16 and designated as an inner side, which inner side is exposed to the prevailing dynamic pressure in the ram air duct 16, and further an opposite surface 30 designated as an outer side which is exposed to the pressure of the relative wind flowing past the aircraft.

An actuator 32 serves to change the position of the ram air intake flap 24 while the position of the ram air escape flap 26 is changeable by means of an actuator 34.

Should more cooling air be required because the compressor output temperature has exceeded the predetermined value the ram air intake flap 24 is forcibly opened slightly with the aid of the actuator 32 in order to enlarge the flow cross section of the ram air intake opening 18. The greater cooling air quantity flowing via the thus enlarged intake cross section into the ram air duct 16 increases the dynamic pressure in the ram air duct 16 and thereby the force acting on the inner side 28 of the ram air intake flap 26. In order to keep the stress on the ram air escape flap 26 including its actuator 34 as low as possible the actuator 34 is provided with a force detecting device 36 which force detecting device 36 detects the force impinging on the actuator 34 due to a difference between the prevailing pressure in the ram air duct 16 and the pressure of the relative wind flowing past the aircraft. The force detecting device 36 is coupled to a control whose objective it is to always adjust the ram air escape flap 26 for the purpose of avoiding high stresses such that the aerodynamic flow forces impinging on the inner side 28 and the outer side 30 of the ram air escape flap 26 are at least approaching equilibrium. Should therefore the greater cooling air quantity obtained via the further opened ram air intake flap 24 lead to a dynamic pressure in ram air duct 16 which dynamic pressure exceeds the relative wind pressure impinging on the outer side 30 of the ram air escape flap 26 the ram air intake flap 26 shall be controllably forcibly opened until the force impinging on the actuator 34 is at least approaching zero, i.e. until the cited force equilibrium has at least substantially ensued. The forcible opening of the ram air escape flap 26 reduces namely the flow resistance of the ram air duct 16 and more precisely of its ram air is escape flap 20 such that the dynamic pressure in ram air duct 16 lowers. Simultaneously in the case of the forcible opening of the ram air escape flap 26 the pressure of the relative wind flowing past increases which pressure impinges on the outer side 30 of the ram air escape flap 26.

Should on the other hand the compressor output temperature fall below the predetermined value the cooling air quantity flowing through the ram air duct 16 must be reduced. This occurs by means of a controlled closing of the ram air intake flap 24 whereby the flow cross section of the ram air duct intake opening 18 is reduced. The dynamic pressure in the ram air duct 16 also falls and consequently the force impinging on the inner side 28 of the ram air escape flap 26. The ram air escape flap 26 is thus forcibly closed until the force impinging on the actuator 34 is at least approaching zero, which is synonymous with an at least substantially present force equilibrium between the aerodynamic pressure forces impinging on the inner side 28 and the outer side 30 of the ram air escape flap 26. By means of the closing of the ram air escape flap 26 the overall flow resistance of the aircraft also reduces.

With the described fresh air generating system 10 the required cooling air quantity for this system can be controlled within wide limits with minimised effect on the overall flow resistance of the aircraft. In addition the ram air escape flap 26 that is controlled as described comprises due to low stresses a good operating reliability and a long service life.

The invention claimed is:

1. Air guiding flap of an aircraft wherein one surface (28) thereof faces an air duct and is exposed to a prevailing pressure in the air duct and an opposite surface (30) thereof is exposed to the pressure of the relative wind flowing past the aircraft, the air guiding flap comprising:
    an actuator (34) for automatically opening and closing the air guiding flap; and
    a force detecting device (36) which detects the force impinging on the actuator (34) based on a difference between the prevailing pressure in the air duct and the pressure of the relative wind flowing past the aircraft,
    wherein the actuator (34) is adapted to adjust the position of the air guiding flap such that the force impinging on the actuator (34) is at least essentially zero.

2. Air guiding flap according to claim 1
    wherein the air guiding flap is a ram air escape flap (26), the pressure in the air duct is a dynamic pressure, and that the ram air escape flap (26) is forcibly closed in the event that the pressure force impinging thereon of the relative wind flowing past the aircraft is greater than the pressure force impinging thereon of the dynamic pressure in the air duct until at least an approaching equilibrium of the said pressure forces ensues.

3. Ram air system for supplying ram air to an auxiliary assembly of an aircraft, comprising a ram air duct (16) having an intake opening and an escape opening and from which ram air duct the required ram air for the auxiliary assembly is taken and further comprising a ram air intake flap (24) controlling the flow cross section of the intake opening and a ram air escape flap controlling the flow cross section of the escape opening wherein
    the quantity of required ram air for the auxiliary assembly is controlled by opening or closing the ram air intake flap (24) and that
    the ram air escape flap (26) is an air guiding flap according to claim 2.

4. Ram air system according to claim 3,
    wherein the auxiliary assembly is a fresh air generating device of an aircraft.

5. Ram air system according to claim 4
    wherein the control parameter for the position of the ram air intake flap (24) is the temperature at the output of a compressor of the fresh air generating device.

6. Ram air system according to claim 5
    wherein the ram air intake flap (24) is forcibly opened in the event that the compressor output temperature exceeds a predetermined temperature value.

7. Ram air system according to claim 5 or 6
    wherein the ram air intake flap (24) is forcibly closed in the event that the compressor output temperature falls short of a predetermined temperature value.

8. Air guiding flap according to claim 1
    wherein the air guiding flap is a rain air escape flap (26), the pressure in the air duct is a dynamic pressure, and the ram air escape flap (26) is forcibly opened in the event that the pressure force impinging thereon of the relative wind flowing past the aircraft is less than the pressure force impinging thereon of the dynamic pressure in the air duct until at least an approaching equilibrium of the said pressure forces ensues.

* * * * *